(12) United States Patent
Sawyer

(10) Patent No.: US 6,371,012 B2
(45) Date of Patent: Apr. 16, 2002

(54) BAKING TRAY

(76) Inventor: Wayne Gary Sawyer, 2 Bando Road, Cronulla, New South Wales 2230 (AU)

( * ) Notice: Subject to any disclaimer, the term of this patent is extended or adjusted under 35 U.S.C. 154(b) by 0 days.

(21) Appl. No.: 09/740,687

(22) Filed: Dec. 19, 2000

Related U.S. Application Data

(63) Continuation-in-part of application No. PCT/AU99/00497, filed on Jun. 18, 1999.

(30) Foreign Application Priority Data

Jun. 19, 1998 (AU) .............................................. PP 4245

(51) Int. Cl.[7] ................................................ A47J 27/00
(52) U.S. Cl. .............................. 99/450; 99/340; 99/426
(58) Field of Search ........................ 99/450, 422, 426, 99/446, 447, 340; 220/912, 573.1, 573.2

(56) References Cited

U.S. PATENT DOCUMENTS 3,651,796 A * 3/1972 Nelson ..................... 99/450 X
4,291,616 A * 9/1981 Taylor ...................... 99/450 X
5,232,609 A * 8/1993 Prevost et al. ................. 99/450

* cited by examiner

*Primary Examiner*—Reginald L. Alexander
(74) *Attorney, Agent, or Firm*—Webb Ziesenheim Logsdon Orkin & Hanson, P.C.

(57) ABSTRACT

The present invention consists in a tray assembly for use as a baking tray, the tray assembly including: a base tray having a generally planar base; a cooling tray having a generally planar surface for receiving at least one article to be baked, the generally planar surface having a plurality of apertures and being adapted to seat on the generally planar base; and elevation device disposed between the base and the cooling trays for sliding engagement therewith, the elevation device being slidable between a first position wherein the cooling tray is seated on the base and a second position wherein the cooling tray is lifted a predetermined distance from the base to allow air circulation through the apertures to cool the or each article.

16 Claims, 16 Drawing Sheets

BAKING TRAY

CROSS-REFERENCE TO RELATED APPLICATIONS

This application is a continuation-in-part of International Patent Application Number PCT/AU99/00497 filed on Jun. 18, 1999, entitled "Improved Baking Tray" and designating, inter alia, the United States, which claims priority to Australian Provisional Patent Application Serial No. PP 4245, filed Jun. 19, 1998.

BACKGROUND OF THE INVENTION

1. Field of the Invention

The present invention relates to cookware. In particular, the invention is directed to improvements in baking tray design.

2. Description of Prior Art

Baking is a well known and commonly used cooking process. Whether in domestic or commercial situations, the baking process usually involves placing the articles to be baked upon a shallow tray which is then placed in an oven and heated to the required level for the required period of time. Once baked, the tray is removed from the oven and the articles are transferred to an elevated wire tray or perforated platform such that the baked articles can cool. The cooling rack is raised and perforated in order to allow the air to circulate around the article to promote quick and even cooling.

Immediately after being removed from the oven, baked articles are generally much softer than they are once they have cooled. Therefore the transfer of the baked articles from the baking tray to the cooling rack can often result in damage to the articles as even careful handling can affect the shape and appearance of an article. Furthermore, excess handling of the baked articles has associated hygiene risks.

In an attempt to overcome this, it is known to provide baking trays or pie tins having perforated inner trays which are designed to be removable from the rest of the baking tray or pie tin. When the pie or other baked article is removed from the oven, it is lifted out of the pie tin using the inner trays so that it does not need to be transferred to a separate tray for cooling. Unfortunately, the baked article can tend to stick to the pie tin through the perforations in the tray. As both hands are required to gently lift the tray, it is often awkward to then ease the pie tin away from the bottom of the tray.

This problem has been addressed to some extent by baking tray arrangements having an apertured inner and outer trays which may be moved relative to each other such that the apertures in both trays align to become cooling holes. However, as the trays must be able to slide over each other, the lower tray cannot be profiled to mate with the apertures of the upper tray in order to provide a flat baking surface. Accordingly, the underside of the baked articles will have an uneven appearance.

Furthermore, this arrangement still places the baked articles at risk of damage as the bottom of the articles are subject to significant shearing forces if they have stuck to both the upper and lower trays during the baking process. In the process of sliding the trays relative to one another to align the cooling holes, the portion of the baked article that is stuck to the lower tray may be sheared off as the upper tray slides over it.

To overcome this, baking trays having complex hinged lever arrangements have been developed to lift the apertured cooling tray directly up from the lowered position. As the cooling tray does not slide laterally relative to the lower tray, the lower tray may have raised areas corresponding to the apertures of the upper tray so that the baking surface provided is substantially flat. However, this type of baking tray design is relatively complex to manufacture, and therefore, ultimately, more expensive than other arrangements. Furthermore, the hinge mechanisms make the trays more difficult to clean as they tend to trap dirt, crumbs and other residues.

SUMMARY OF THE INVENTION

The present invention aims to overcome or ameliorate at least one of the disadvantages of the prior art or at least provide a useful alternative.

Accordingly, the present invention provides a tray assembly for use as a baking tray, said tray assembly including:

a base tray having a generally planar base;

cooling tray having a generally planar surface for receiving at least one article to be baked, the generally planar surface having a plurality of apertures and being adapted to seat on the generally planar base; and elevation means disposed between the base and the cooling trays for sliding engagement therewith, said elevation means being slidable between a first position wherein the cooling tray is seated on the base tray, and a second position wherein the cooling tray is lifted a predetermined distance from the base tray to allow air circulation through the apertures to cool the or each article.

In a preferred embodiment, the generally planar base includes raised portions corresponding to the apertures wherein the upper surface of the raised portions are flush with the generally planar surface when the cooling tray is seated on the base.

The base tray may have a raised peripheral edge to prevent the or each articles from sliding off the surface when the cooling tray is seated on the base. Preferably, the elevation means is adapted to lift the cooling tray to a distance above the raised peripheral edge of the base tray.

In one embodiment, the base and cooling trays are rectangular and the elevation means includes four manually slidable members disposed within the base tray such that a pair of the slidable members are positioned adjacent a first side of the base and the other pair of slidable members positioned adjacent the opposite side of the base, each of the slidable members having an inclined surface which coacts with inclined profiles formed on two opposing sides of the cooling tray such that the cooling tray is lifted when the slidable members of each pair are manually slid towards each other. The tray assembly may be provided with a slide track means for directional stability when the slidable members are moved towards or away from each other. The slide track means may be a ridge or flange formed on the slidable members which extends into respective grooves provided on the base tray. Conveniently the slidable members are each provided with a protruding handle which extend through a slot in the side of the base tray such that the respective handles may be drawn together with a thumb and forefinger. The slidable members may also be provided with retaining means to retain them in the second position.

According to another preferred form the base and cooling trays are rectangular and the elevation means includes two manually slidable members disposed within the base tray such that one of the slidable members is positioned adjacent the first side of the base and the other slidable member is positioned adjacent the other side of the base, each slidable member having a profile which coacts with a corresponding profile formed on the cooling tray such that the cooling tray is lifted a predetermined distance when the slidable members are slidably rotated between the first position and the second position.

Other preferred forms of the baking tray assembly include a cover adapted to fit over the or each article to be baked. In a preferred form, the cover includes an array of air holes. Such an arrangement would allow "blind baking" which is a term used in this field to describe the process of baking without browning of the baked articles.

In some forms, the baking tray assembly may further include stacking means to allow a plurality of the tray assemblies to be vertically stacked on each other such that baked articles on each of the assemblies may be baked simultaneously. In one form, the tray assembly includes stacking struts and the base tray includes recesses for positioning and stabilizing the struts.

In some preferred embodiments the elevation means is a pair of elongate members bent into a generally u-shaped configuration no wider than the base tray so that the u-shaped members can lie flat on the base tray with their respective legs extending towards each other;

the free end of both legs, of each u-shaped member, have a raised arcuate portion extending upwardly when the u-shaped members lie flat on the base tray;

the cooling tray having a pair of raised flanges on two opposing sides, the raised flanges in each pair being spaced apart so that when the u-shaped members are in the first position where they are retracted and relatively close to each other, the cooling tray is seated on the base; and, when the u-shaped members are pulled away from each other into the second position, the raised flanges ride up on the arcuate portions to lift the cooling tray a predetermined distance from the base to allow air circulation through the apertures to cool the or each article.

In these forms, it is preferable that the ends of the u-shaped members have stop means to abut the raised flanges when the u-shaped members reach the second position.

BRIEF DESCRIPTION OF THE DRAWINGS

A preferred embodiment of the invention will now be described by way of example only with reference to the accompanying drawings in which.

DETAILED DESCRIPTION OF THE INVENTION

Figure 1:
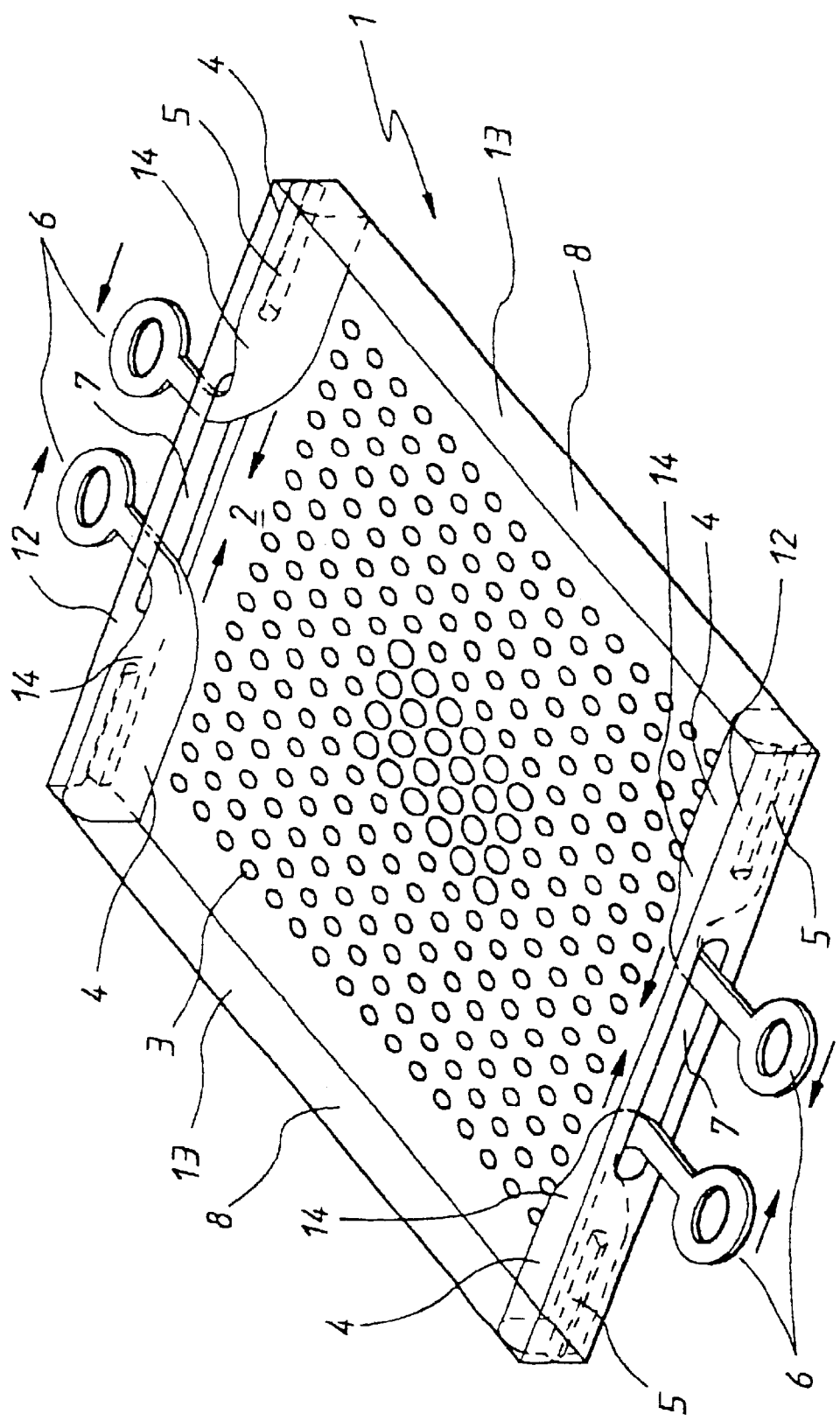
FIG. 1 is a perspective view of the base tray of the baking tray assembly.
Figure 2A:
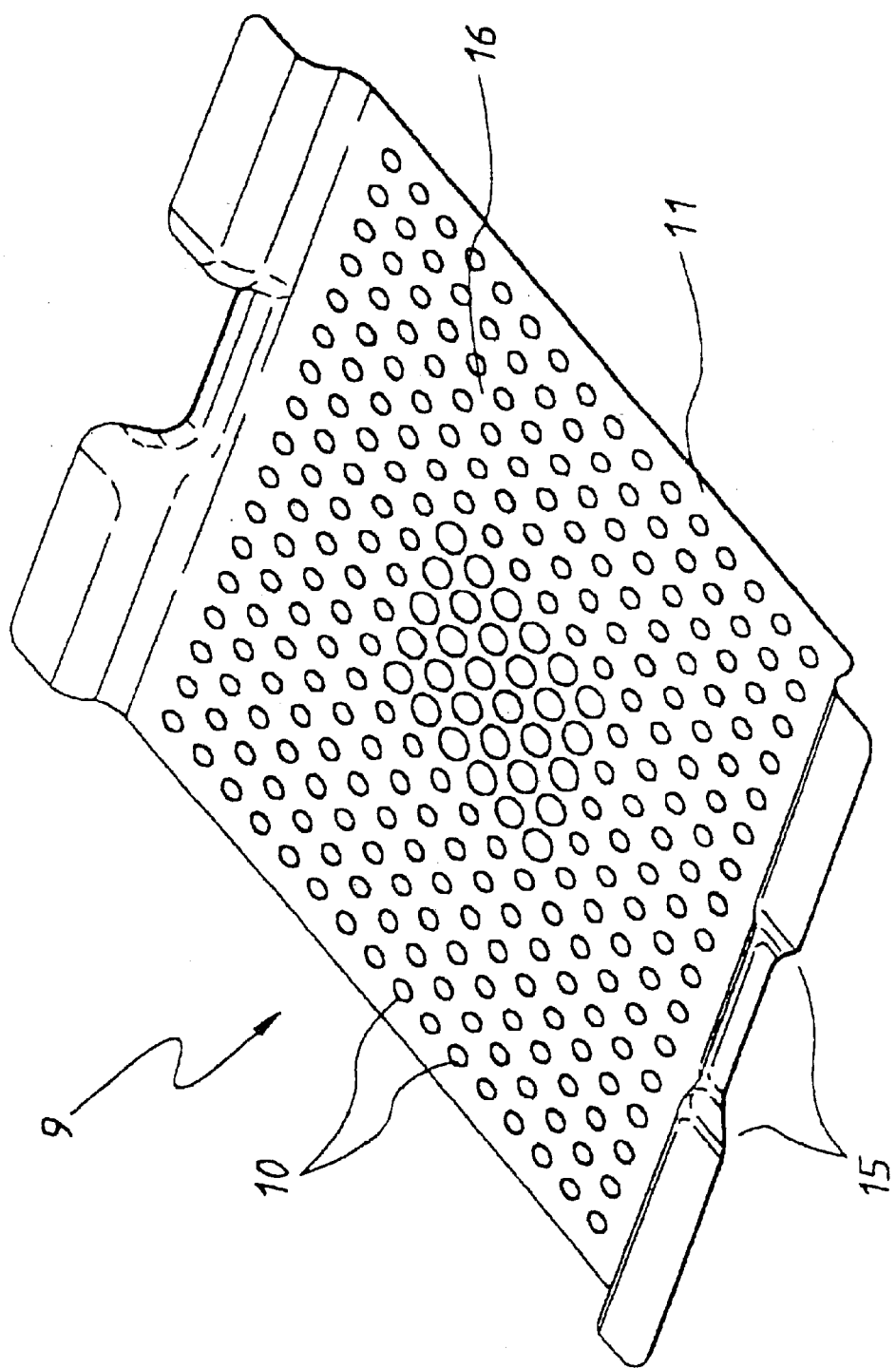
FIG. 2a is a perspective view of the cooling tray.
Figure 2B:
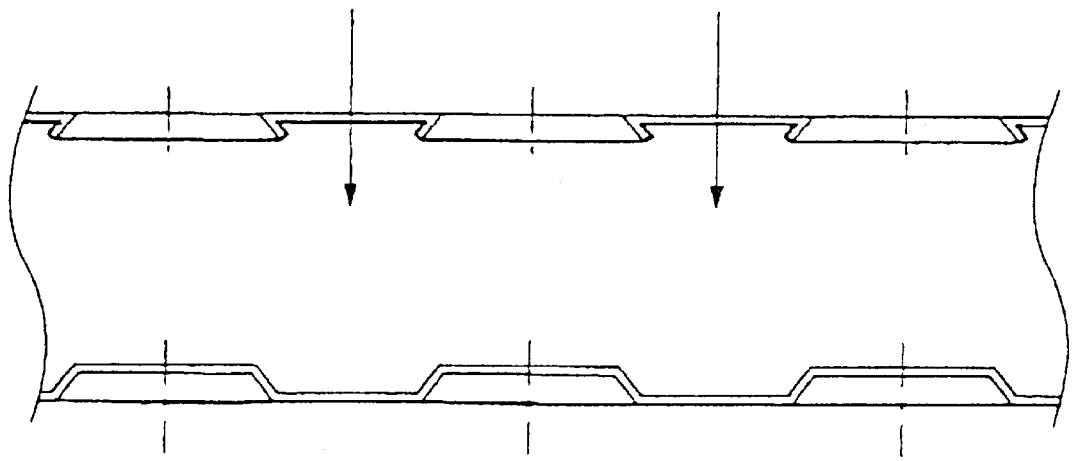
FIGS. 2b and 2c are schematic sectional views of the cooling tray and the base tray.
Figure 2C:
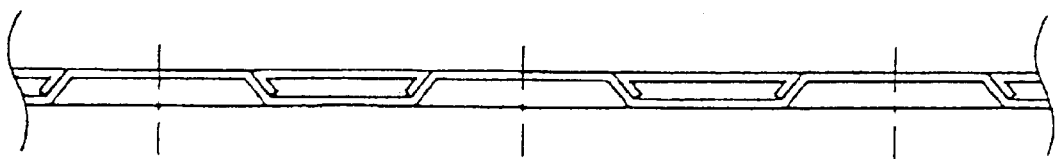

Referring to FIGS. 1, 2a, 2b and 2c, the base tray (1) has a generally planar base (2) with raised areas (3) which correspond to the size and shape of the cooling holes (10) in the cooling tray (9). Slidable members (4) are configured to slide towards and away from each other along the ends of the base (2) against the end walls (12). When each pair of slidable members (4) are slid apart from each other to abut the opposing side walls (13) the inclined surfaces (14) and complementary profiles (15) of the cooling tray (9) allow the cooling tray (9) to seat on the base tray (1). As best shown in FIGS. 2b and 2c, when the cooling tray is seated on the base tray, the raised areas (3) extend into the cooling holes (10) to be flush with the baking surface (16). The flush fit of the raised areas (3) into the cooling holes (10) allows the baking surface (16) to present a substantially uninterrupted flat surface that will not leave significant impressions on the underside of the articles (not shown).

Once the articles have been baked, the tray assembly can be removed from the oven (not shown) to allow the articles to cool. Conventionally, the articles will be transferred from the baking tray to a cooling rack. However, due to the temperature of the tray and the relative softness of baked articles fresh from the oven, this can often prove inconvenient and may also cause damage to the appearance of the articles. The tray assembly of the present invention may be selectively used as both a baking tray and a cooling tray so that the baked articles do not need to be handled at all until they have cooled.

To raise the cooling tray (9), the handles (6) protruding through the slots (7) in each of the end walls (12) are gripped between the thumb and forefinger and drawn together. Drawing together the handles (6) is a simple action which would not be hindered by an oven mitt or cloth used to protect the hand.

As the slidable members (4) are drawn together, the inclined surfaces (14) operatively engage the corresponding profiles (15) on the cooling tray (9) to elevate the tray away from the base (2) this serves to open the air holes (10) to allow circulation about the articles. The base tray (1) could also include some form of retaining mechanism to secure the cooling tray (9) in its elevated position while the articles cooled.

Figure 3:
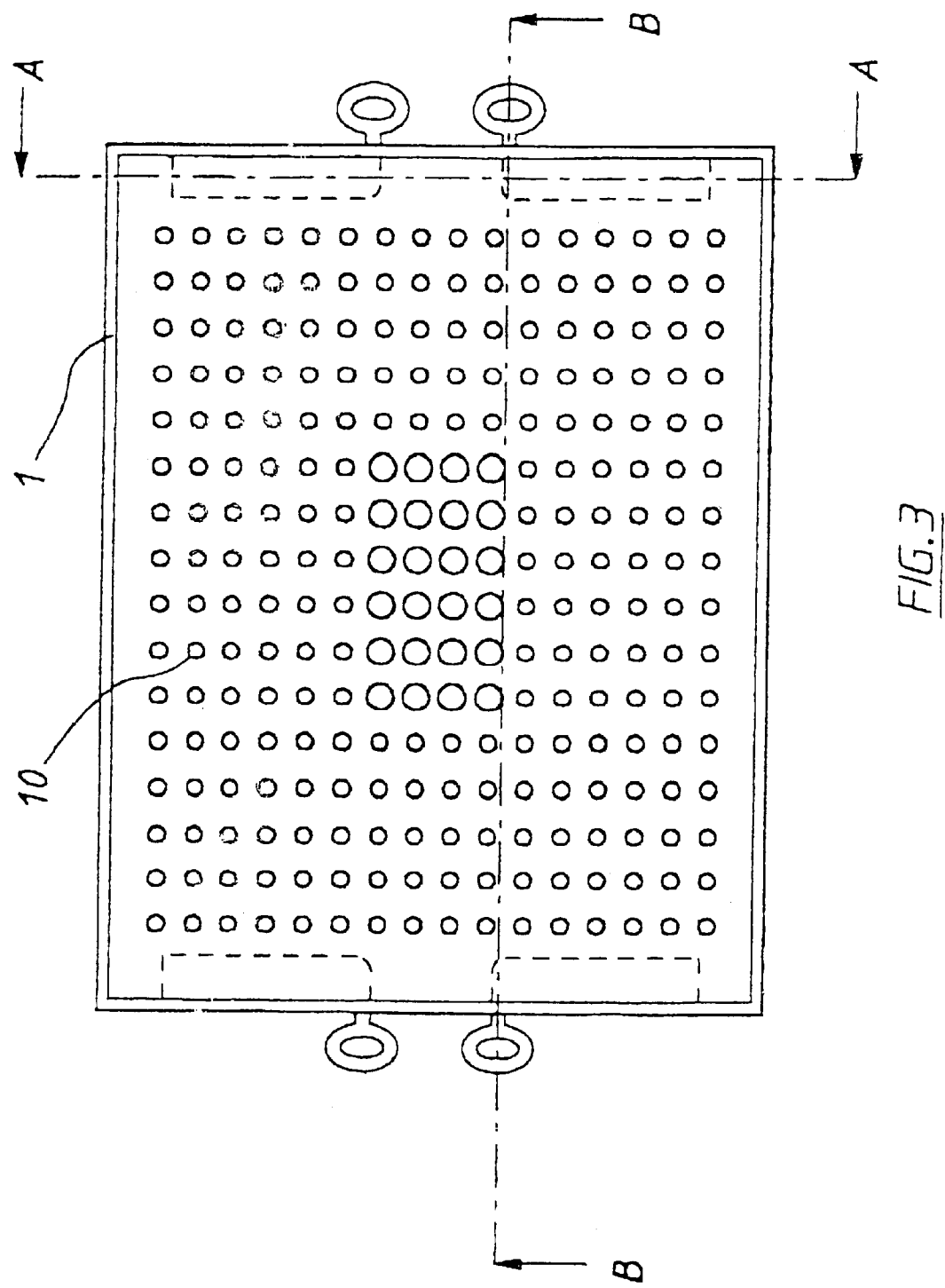
FIG. 3 is a plan view of the baking tray assembly.
Figure 4:
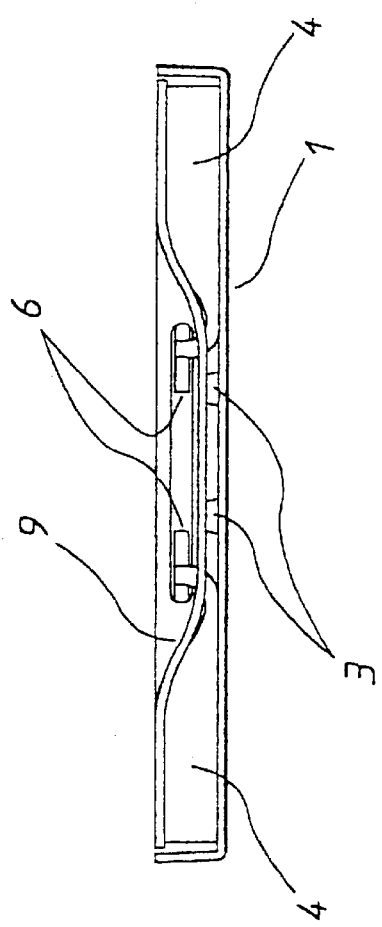
FIG. 4 is a partially sectioned end view of the baking tray assembly when viewed from section AA.
Figure 5:
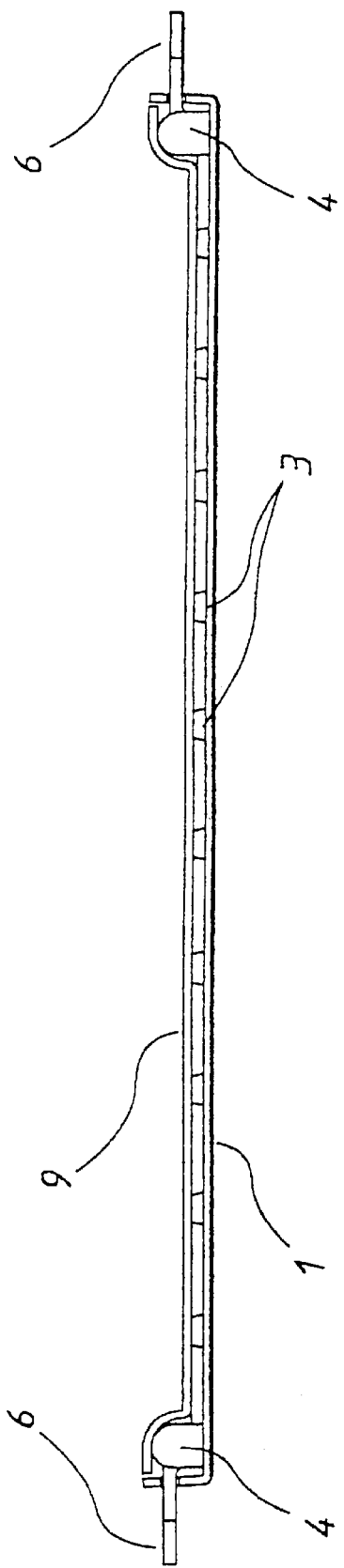
FIG. 5 is a sectional elevation of the baking tray assembly viewed from section BB.
Figure 6:
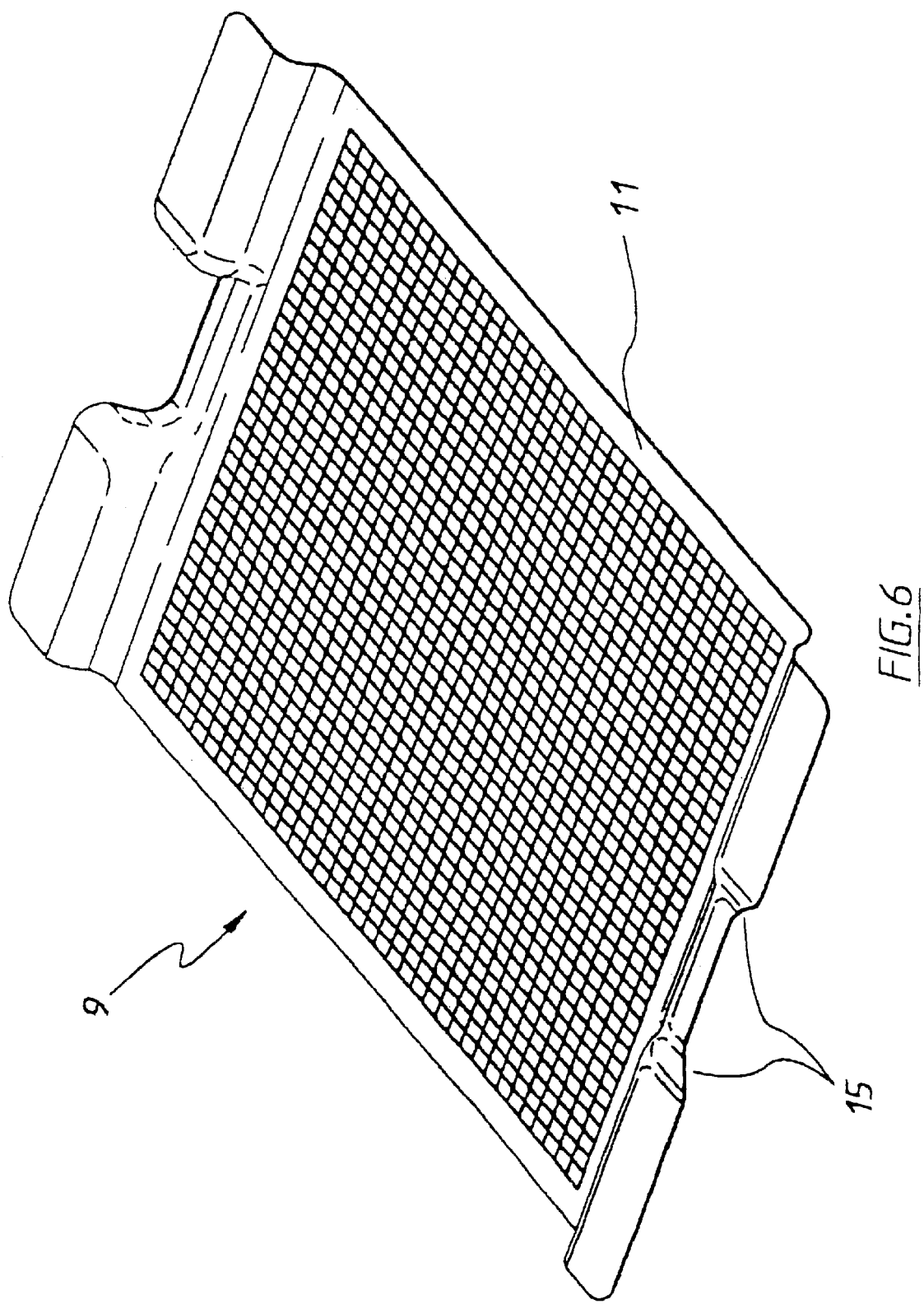
FIG. 6 is a perspective view of a wire rack embodiment of the cooling tray.

With reference to FIG. 3, it can be seen that the cooling apertures (10) in the middle of the cooling tray (9) may be larger than the remaining cooling apertures (10) in order to compensate for the greater amount of heat that will be stored in the middle portion of the tray assembly. Of course, this will require that the corresponding raised areas (3) of the base tray (1) will also need to be larger.

Figure 7:
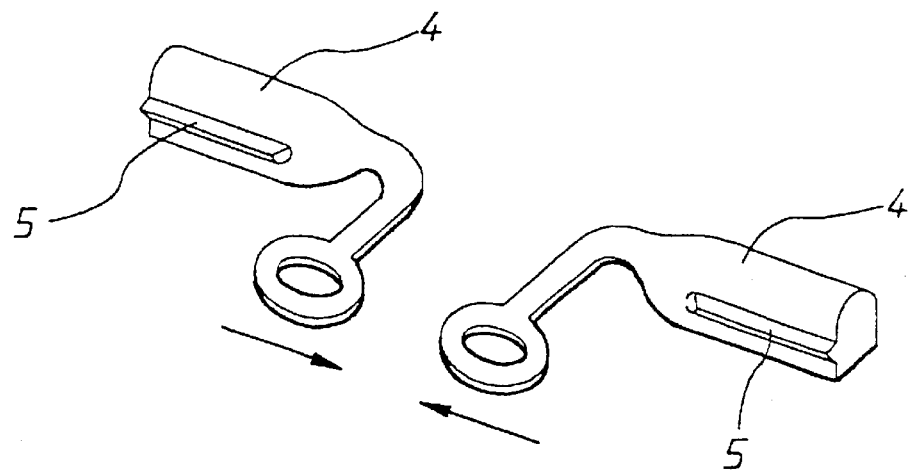
FIG. 7 is a perspective view of the slidable members.
Figure 8A:
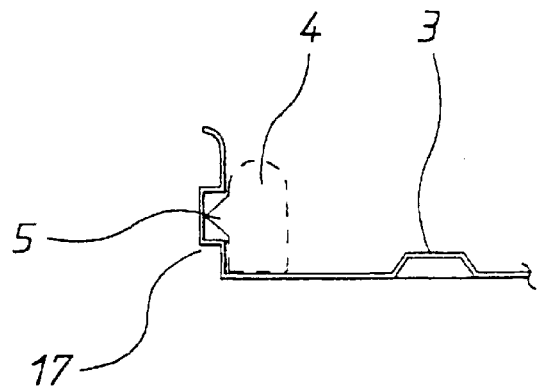
FIGS. 8a and 8b are schematic partial sectional views of embodiments of the slidable members seated in the base tray.
Figure 8B:
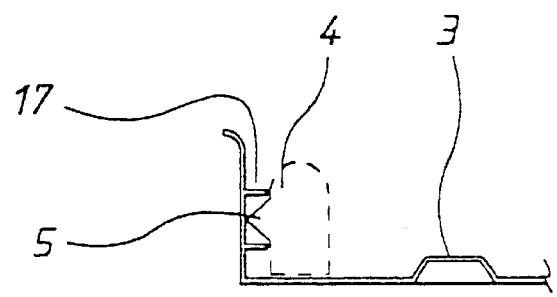

Referring to FIGS. 7 and 8, the end walls (12) of the raised peripheral edge (8) are provided with a guide or channel (17). The rib (5) formed on the slidable members is received in the channel (17) to provide directional stability during the sliding movement of the members (4). The rib (5) is not positively retained within the channel (17) so that the slidable members (4) are readily removable to enable convenient and thorough cleaning. Furthermore, it will be appreciated that each part of the tray assembly easily separates from the rest for the purpose of cleaning. As shown by the preferred embodiments, the individual parts of the assembly can be formed in relatively simple shapes which will not provide any dirt or crumb traps that are difficult to clean.

Figure 9:
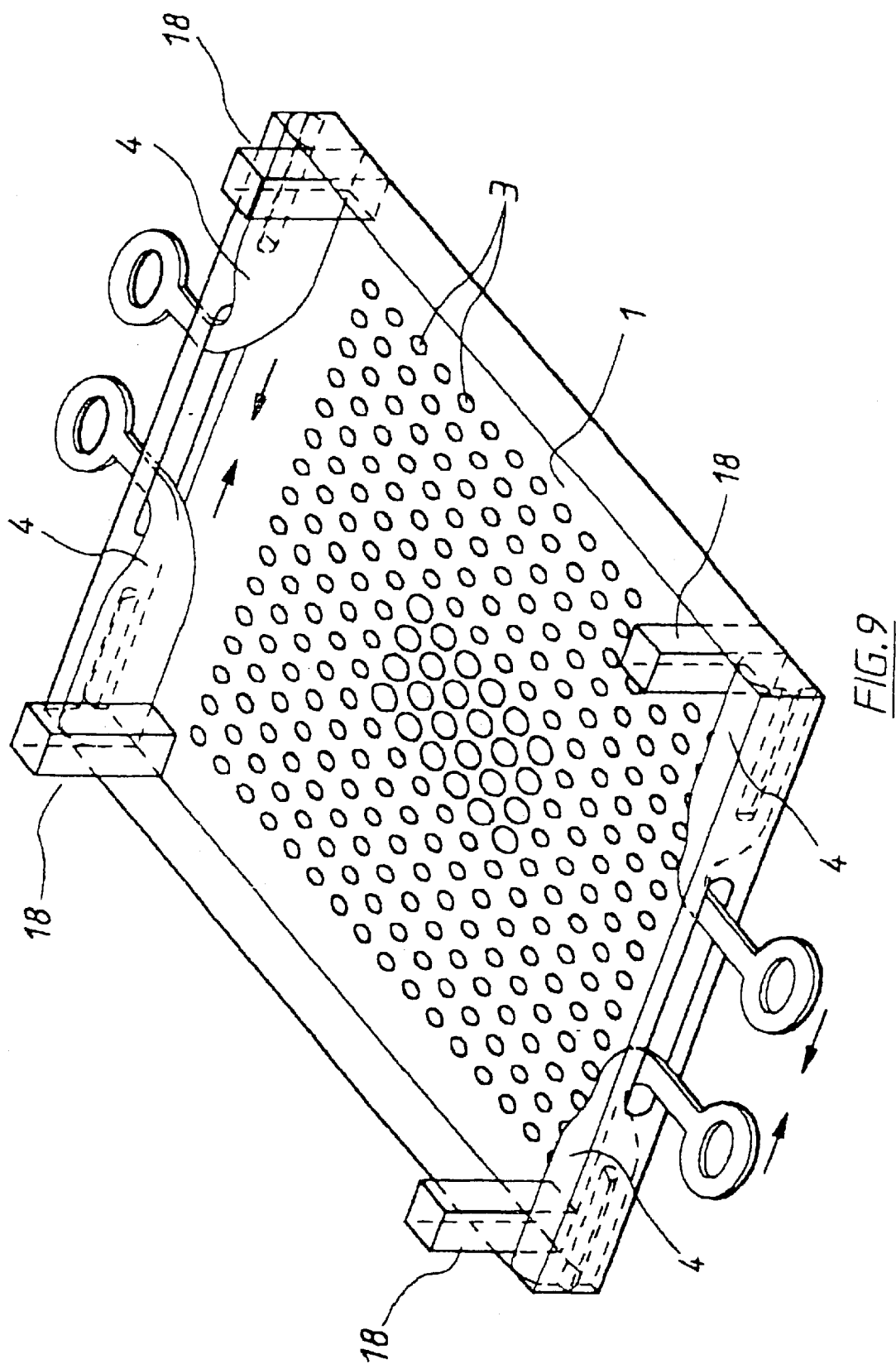
FIG. 9 is a perspective view of the tray assembly together with four stacking struts to allow vertical stacking of a plurality of tray assemblies.

As shown in FIG. 9, the baking tray assembly may be provided with means to enable a plurality of tray assemblies to be vertically staked on one another. In this way, the number of verticals at any one time can be multiplied by the number of tray assemblies in the stack. The embodiment shown in FIG. 9 uses four strut members (18) positioned proximate the corners of the tray assembly. Again, it might be appreciated that the struts are formed in relatively simple shapes and may be readily removable from the rest of the tray assembly for convenient cleaning.

Figure 10:
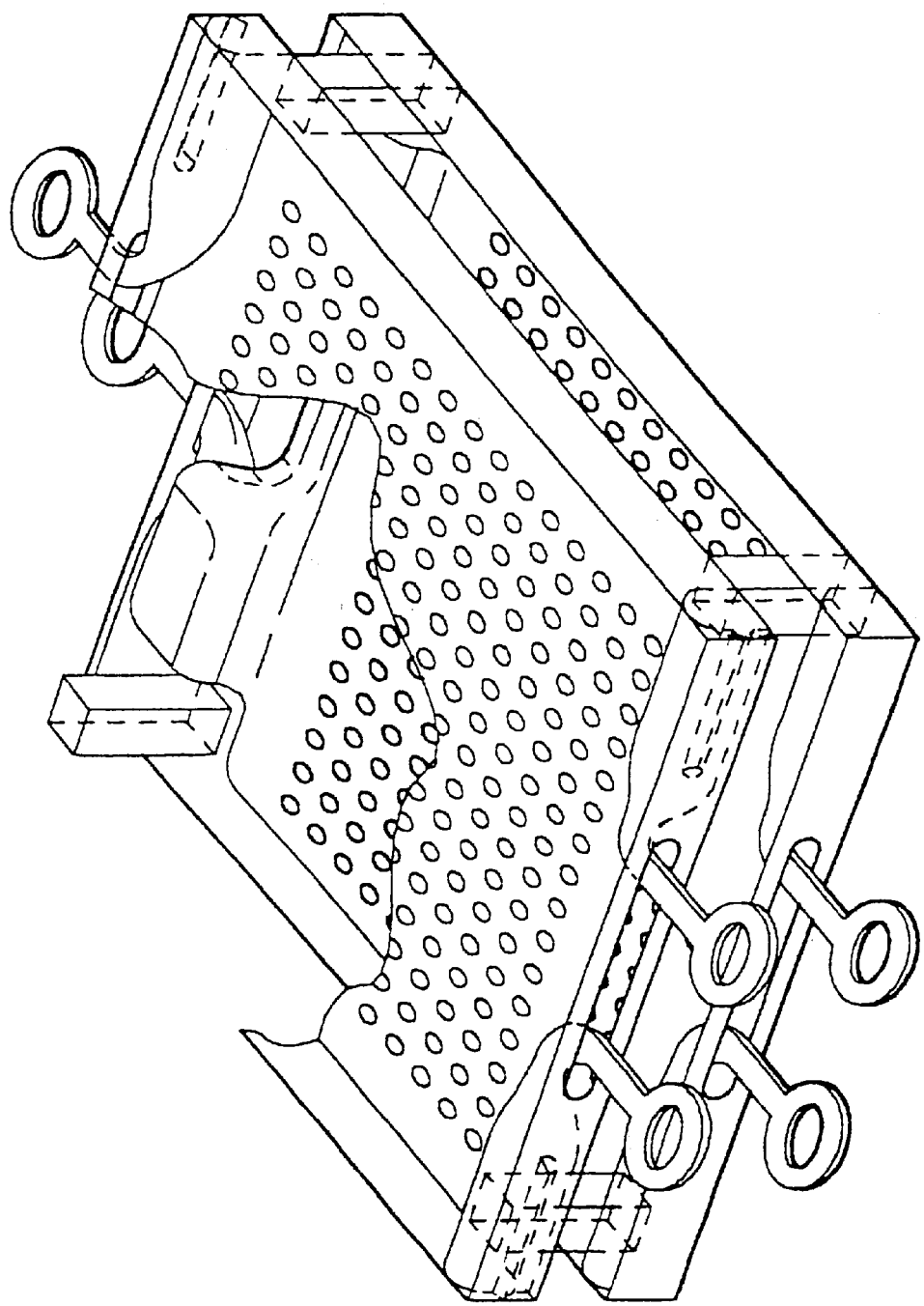
FIG. 10 is a schematic perspective of two tray assemblies according to the present invention vertically stacked using the stacking struts.

The schematic perspective of FIG. 10 shows recesses formed in the base tray to assist the positioning and the stability of the stacking struts (18).

Figure 11A:
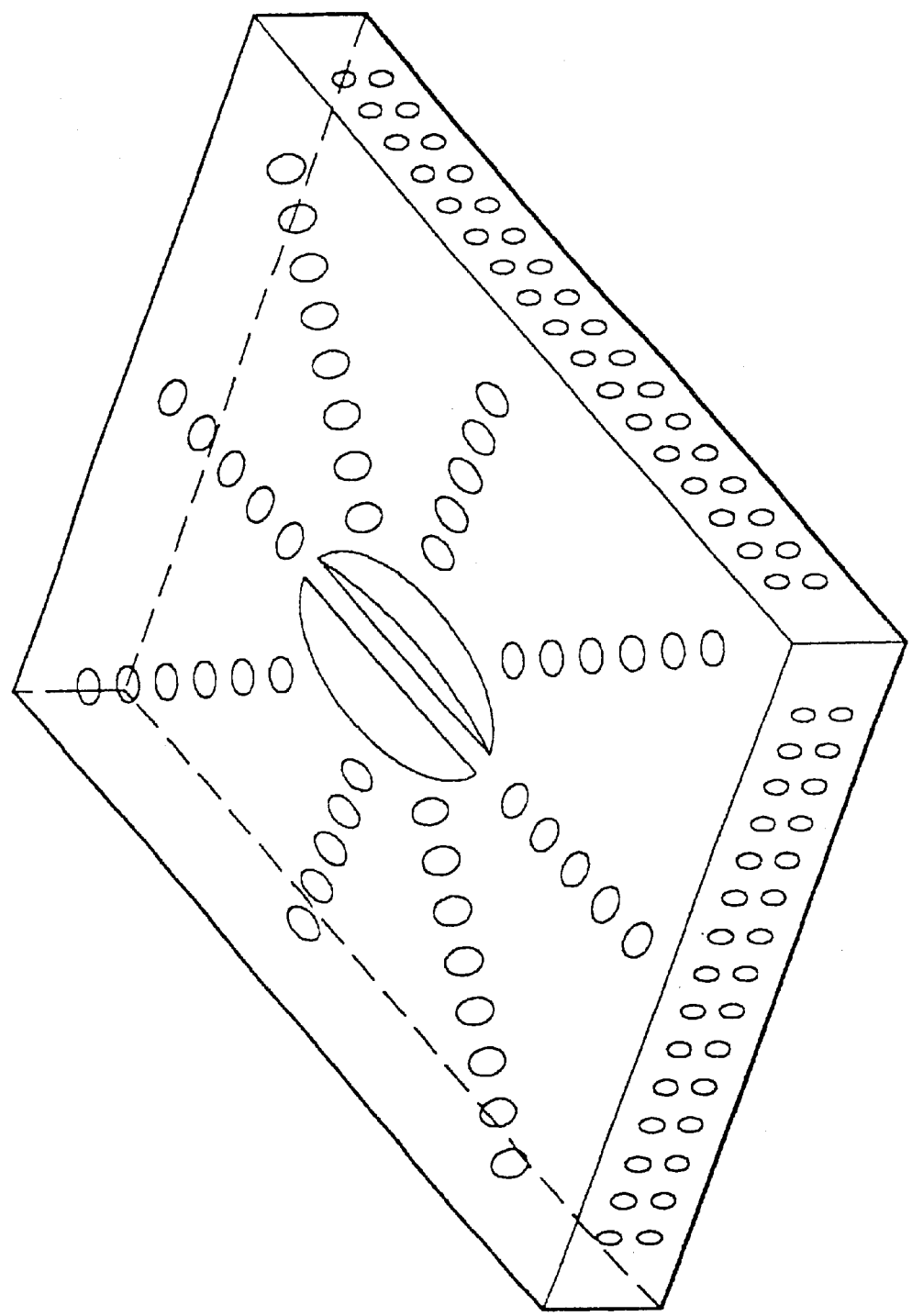
FIG. 11a is a perspective view of a cover for the tray assembly.
Figure 11B:
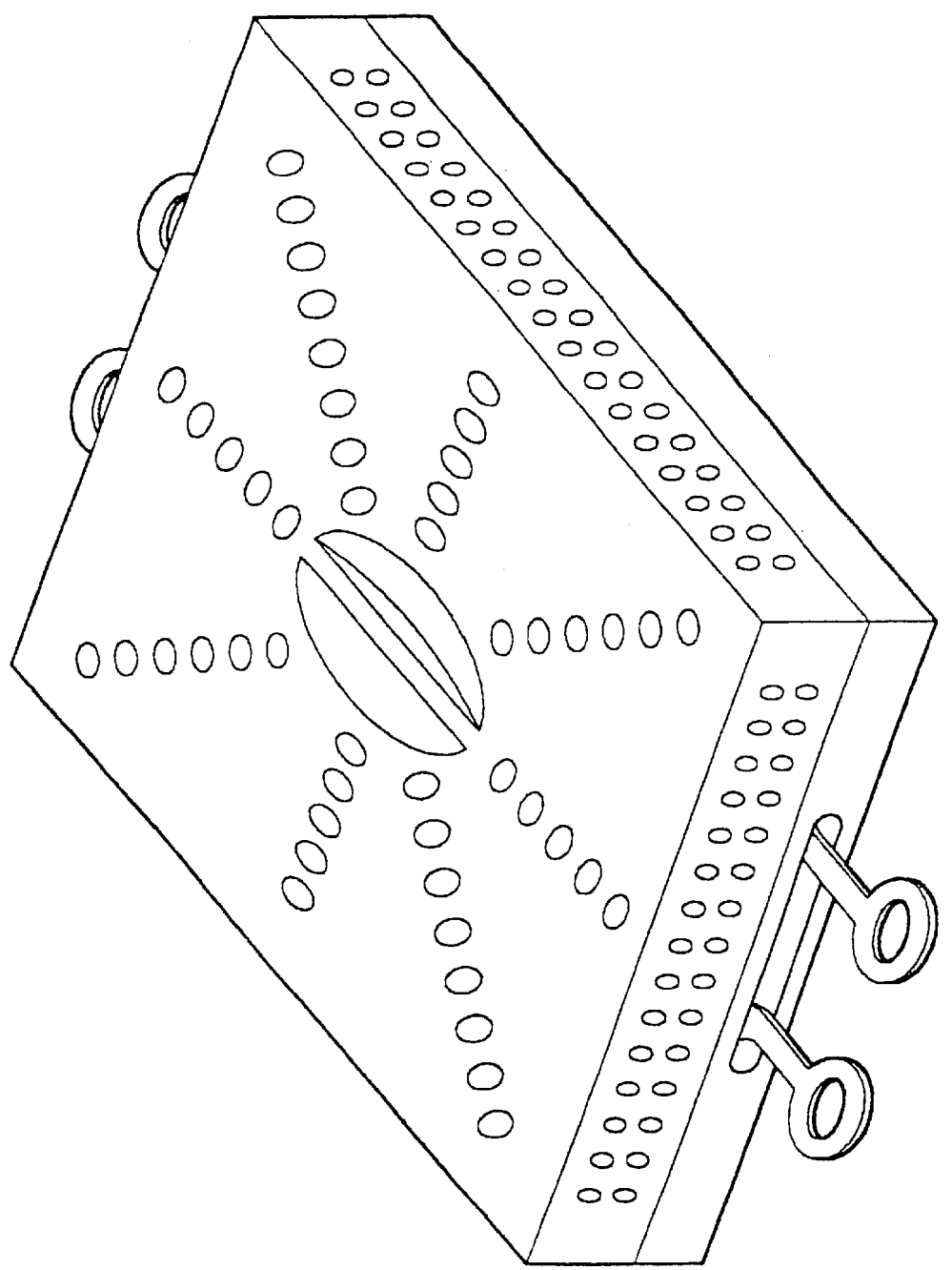
FIG. 11b is a perspective view of the cover in position on the tray assembly.
Figure 12:
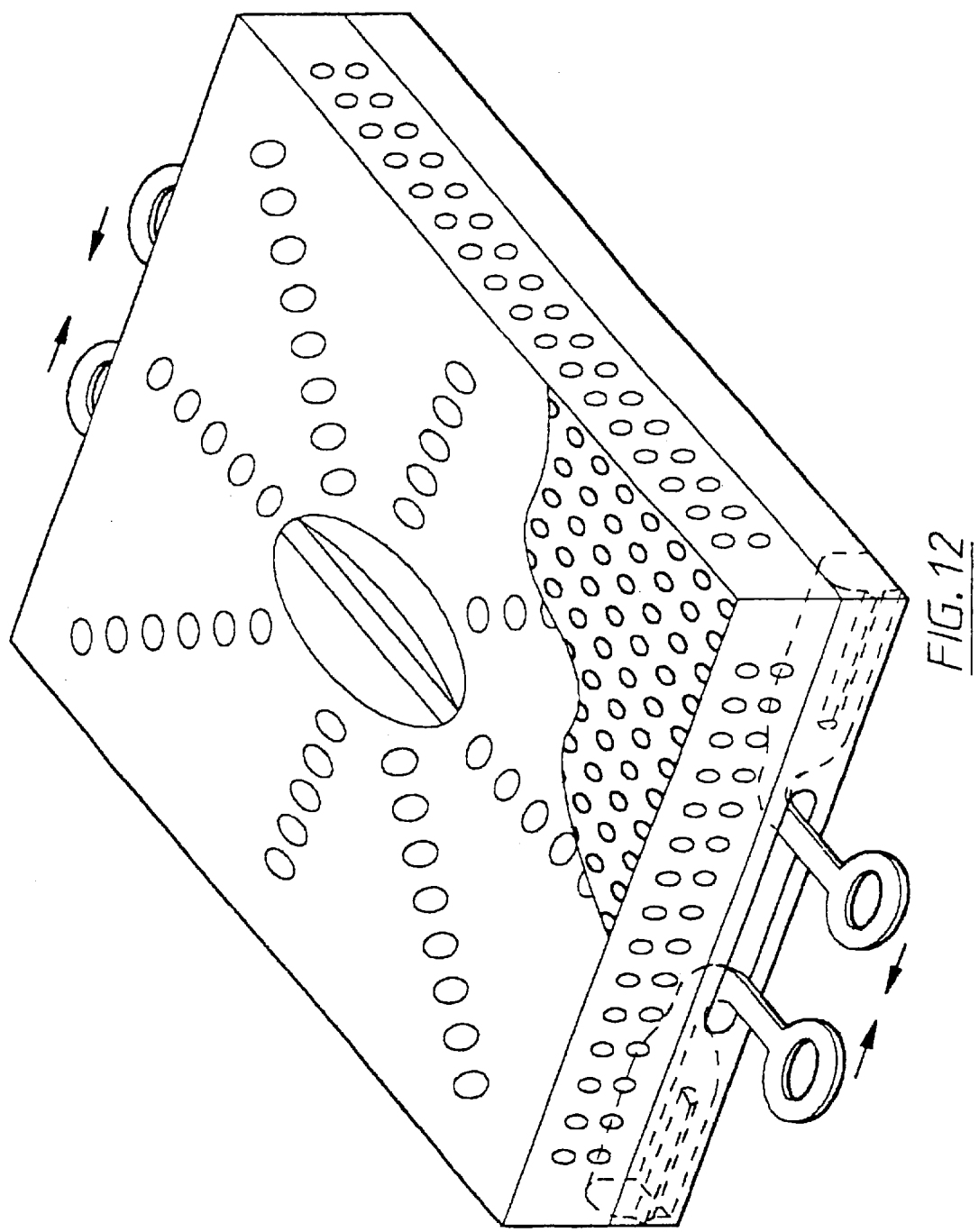
FIG. 12 is a perspective view of the tray assembly and cover showing the base tray and slidable members.

Referring to FIGS. 11a and 11b, the tray assembly may include a cover which may be used for "blind baking". Blind baking is a term used within this particular field to refer to baking without significant browning of the baked articles. The cover is fitted with air holes and when fitted in position, the tray assembly acts like a mini oven.

Figure 13:
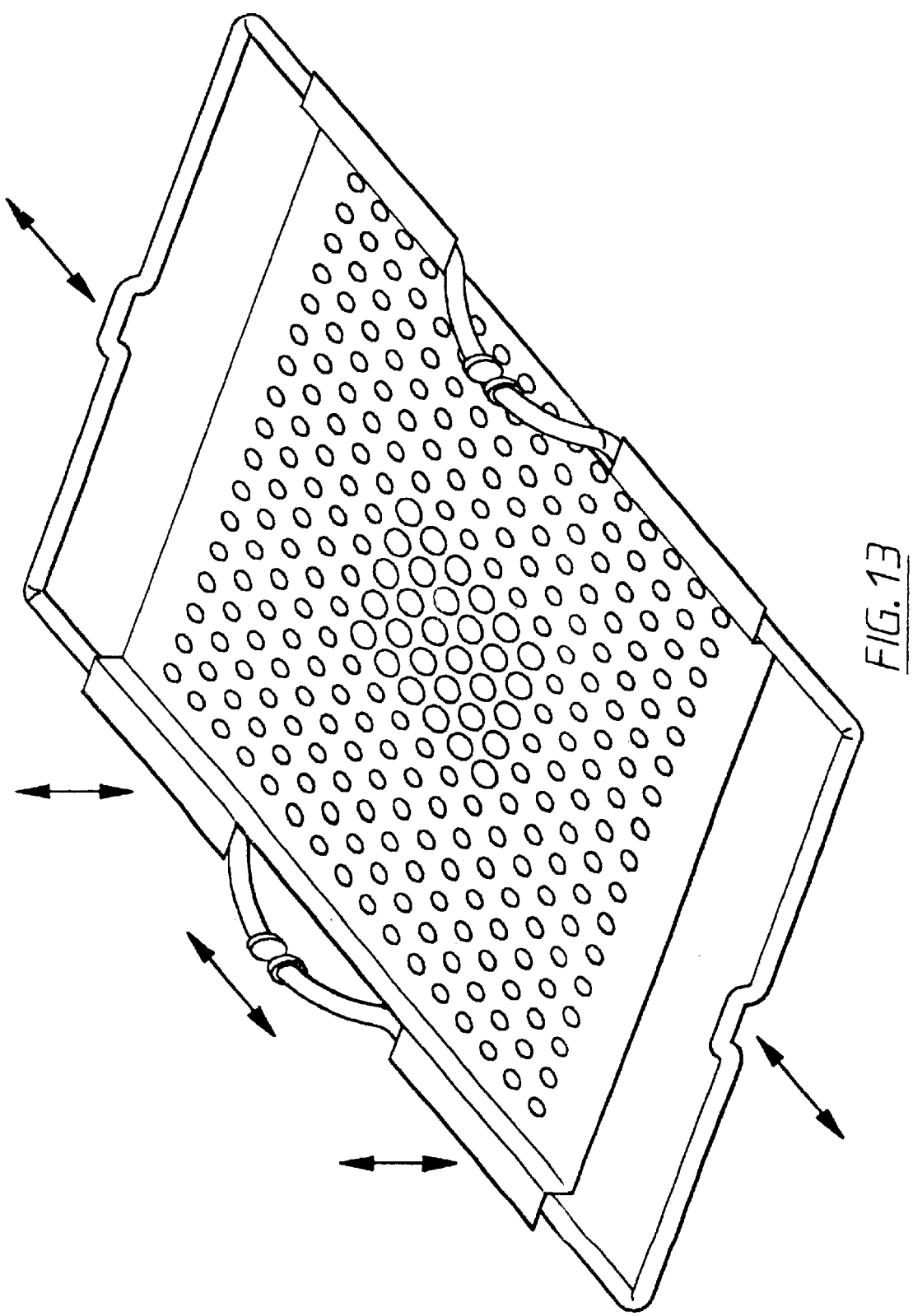
FIG. 13 is a perspective view of a further embodiment of the elevation means and cooling tray.
Figure 14:
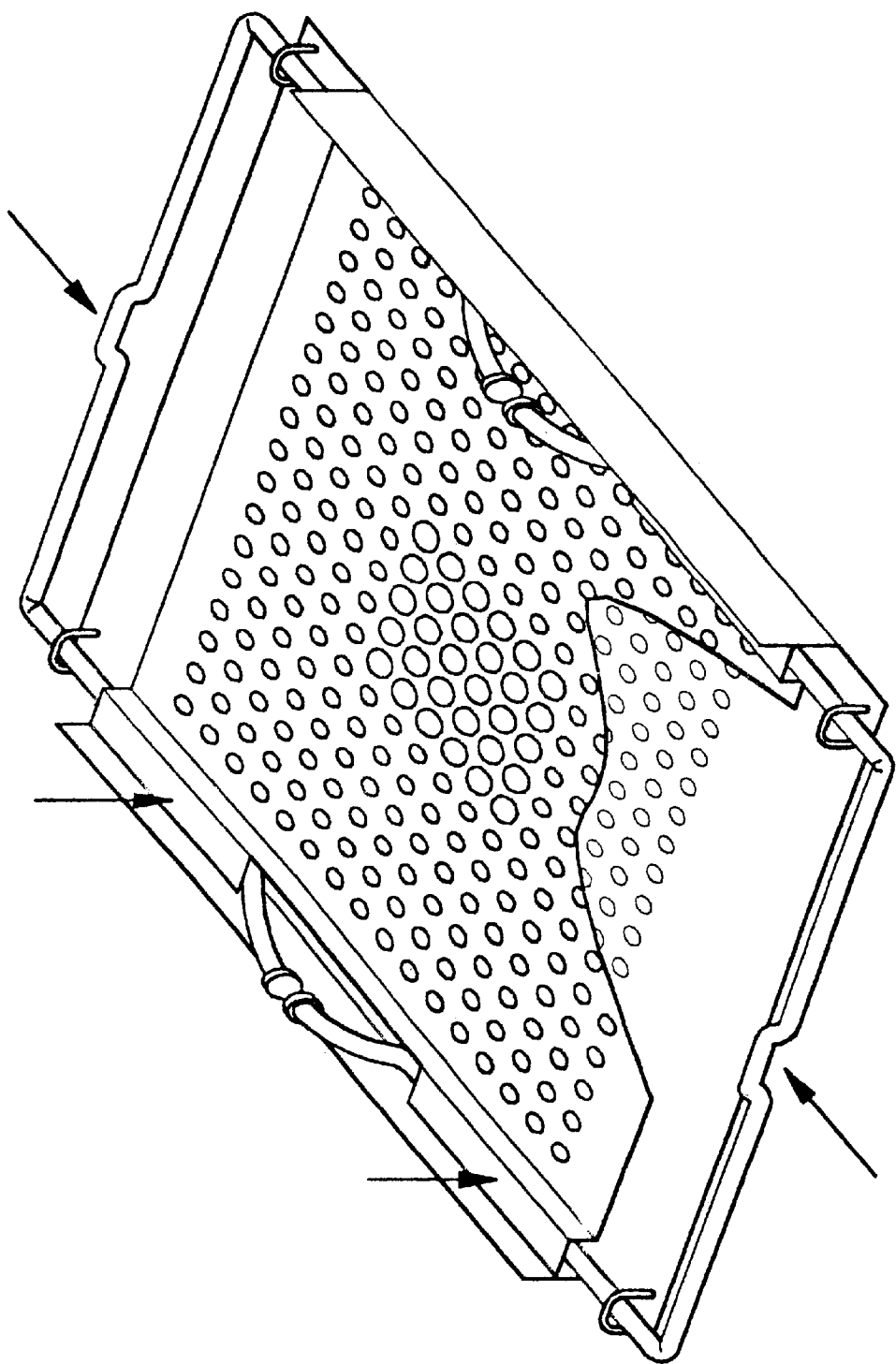
FIG. 14 shows a perspective view of the embodiment shown in FIG. 13 with the elevation means in the first position and the cooling tray seated on the base.
Figure 15:
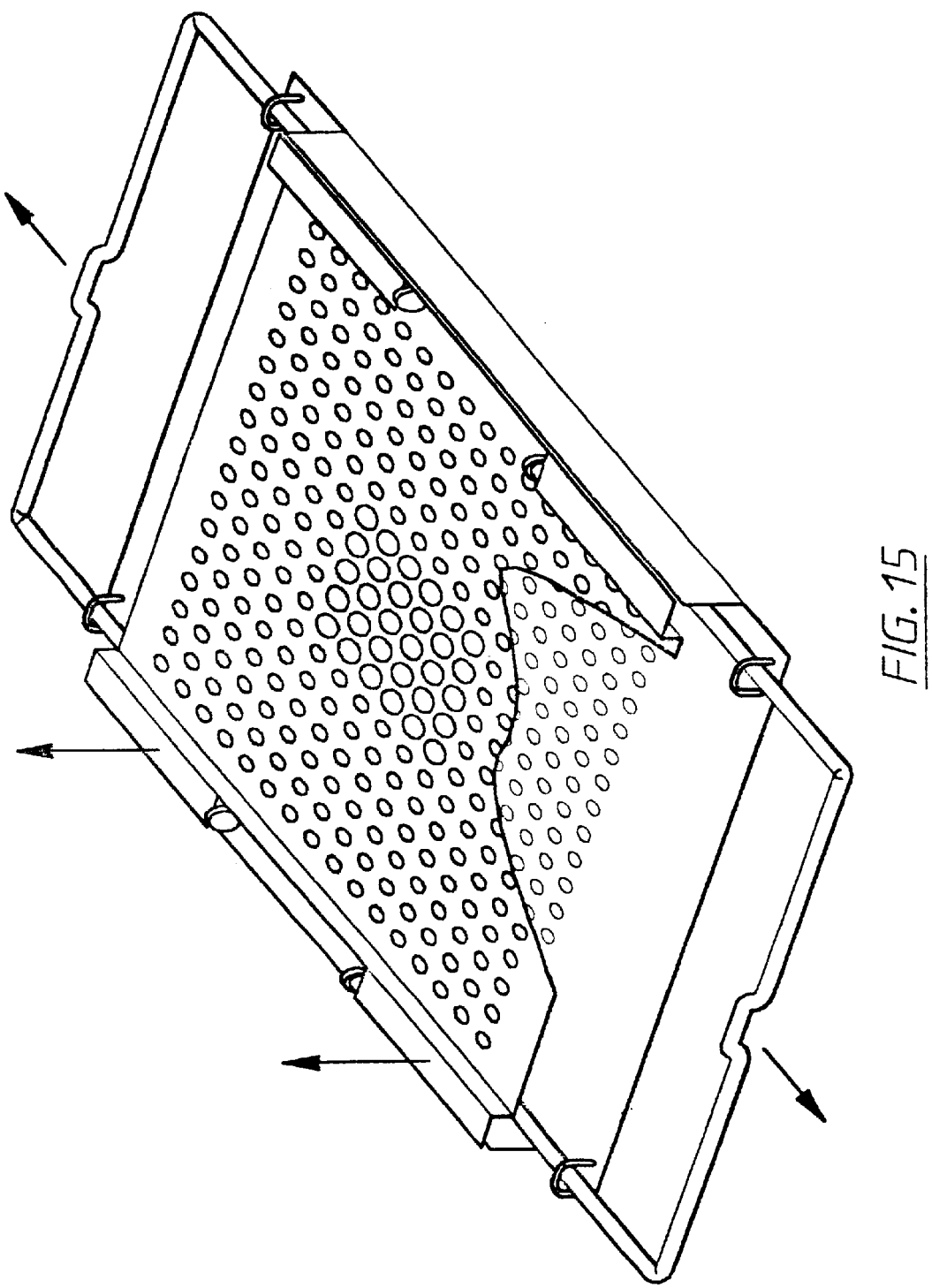
FIG. 15 shows a perspective view of the embodiment shown in FIG. 13 with the elevation means in the second position and the cooling tray raised from the base.

Other embodiments of baking tray assemblies according to the invention are shown in FIGS. 13 to 15. In FIG. 13, the slidable members are a pair of stainless steel tubes 4 bent into a generally u-shaped configuration. The legs 20 of each u-shaped stainless steel tube 4 have an upwardly extending arcuate portion 21. The rectangular cooling tray 9 has a pair of raised flanges 19 on each of its long sides. Each pair of flanges 19 is spaced so that when the stainless steel tubes are in their retracted configuration (see FIG. 14), the cooling tray 9 is seated on the base tray 1. Pulling the tubes 4 away from each other, as shown in FIG. 13, causes the flanges 19 to ride upon the arcuate portions 21 to lift the cooling tray 9 into its raised configuration (see FIG. 15). Stops 22 at the distal ends of the legs 20 prevent the tubes 4 from being pulled out from between the base and cooling trays.

The baking tray assembly according to this embodiment is relatively inexpensive to manufacture because the components do not have complex geometric shapes. It will be readily appreciated by those skilled in the art that many variations exist such as the incorporation of inclined ends on the u-shaped members. However, it is presently envisaged that bending the ends about a mandrill is the most convenient and cost effective method of profiling the u-shaped tubes for lifting the upper tray.

Figure 13A:
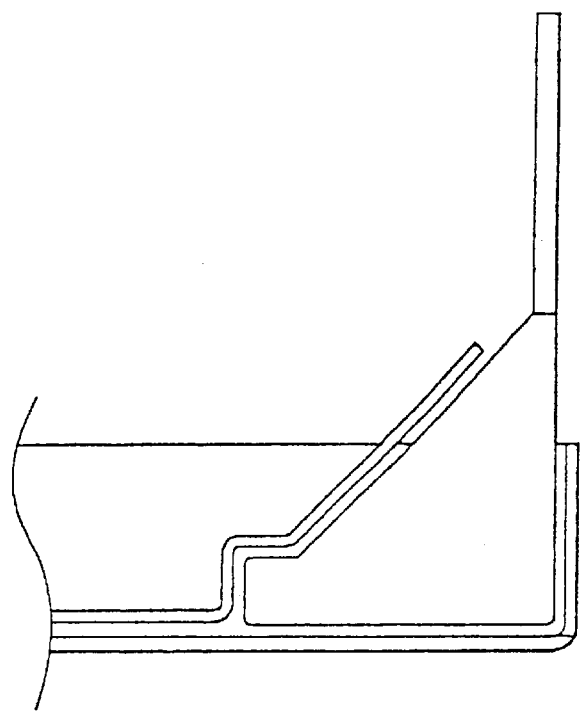
FIGS. 13a and 13b show a schematic partial sectional view of another embodiment of a tray assembly according to the present invention with the cooling tray in the lowered and raised positioned respectively.
Figure 13B:
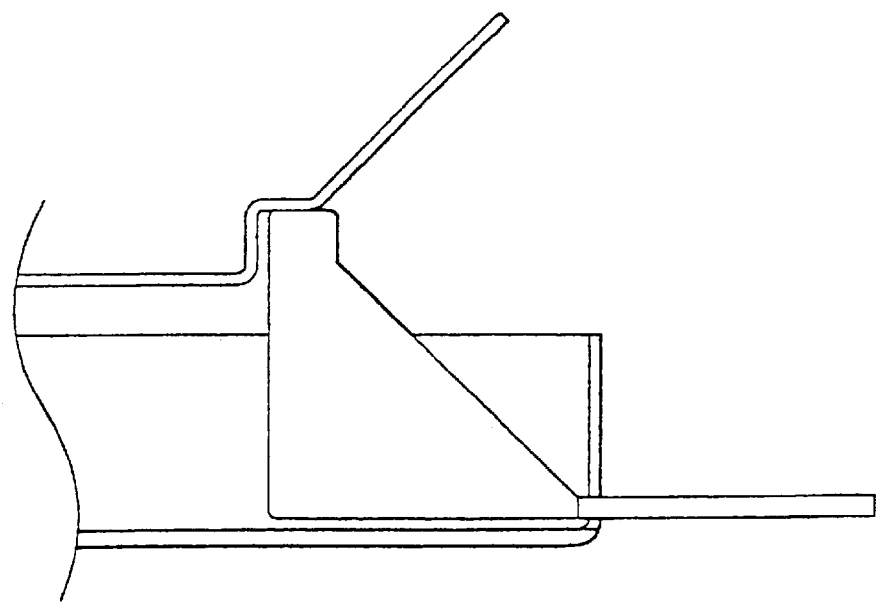

The embodiment of the present invention is shown in FIGS. 13a and 13b uses slideable members that have a more complex geometry but does not require as much bench space to lift the upper tray. In this embodiment, only one slidable member is provided at each end of the base tray. Instead of sliding laterally, the slidable members are slid in rotational manner such that the handle is received in a vertical slot formed in the end wall of the base tray. FIG. 13a shows the slidable member in a first position wherein the cooling tray is seated on the base tray and FIG. 13b shows the slidable member in the second position wherein the cooling tray is held in a raised position. It will be appreciated that this embodiment also readily lends itself to convenient and thorough cleaning.

The baking tray assembly according to the present invention may also be used for "dry frying". This process refers to the fat free cooking of products such as readily available supermarket items including chips, crumbed products and so on. Dry frying of these products is achieved by simply maintaining the cooling tray in the raised position during the cooking process.

The baking tray assembly may be formed from light weight non-buckling sheet metal and the baking surface (16) may be provided with a suitable non-stick coating for convenient removal of the baked articles. The baking tray assembly (1) may also include a separate airtight container (not shown). Once the trays have sufficiently cooled they could be placed into the container in order to preserve the freshness of the baked articles.

The invention has been described herein by way of example only with reference to specific embodiments. Competent workers in this field will readily recognize many variations and modifications which do not depart from the spirit and scope of the broad inventive concept.

I claim:

1. A tray assembly for use as a baking tray, said tray assembly including:

a base tray having a generally planar base;

a cooling tray having a generally planar surface for receiving at least one article to be baked, the generally planar surface having a plurality of apertures and being adapted to seat on the generally planar base; and elevation means disposed between the base and the cooling trays for sliding engagement therewith, said elevation means being slidable between a first position wherein the cooling tray is seated on the base, and a second position wherein the cooling tray is lifted a predetermined distance from the base to allow air circulation through the apertures to cool the at least one article.

2. The tray assembly according to claim 1, wherein the generally planar base includes raised portions corresponding to the apertures, wherein an upper surface of the raised portions are flush with the generally planar surface when the cooling tray is seated on the base.

3. The tray assembly according to claim 1, wherein the base and cooling trays are rectangular and the elevation means include four manually slidable members disposed within the base tray such that a pair of slidable members are positioned adjacent a first side of the base and the other pair of slidable members are positioned adjacent an opposite side of the base, each of the slidable members having an inclined surface which coacts with inclined side profiles formed on the cooling tray such that the cooling tray is lifted a predetermined distance when the slidable members of each pair are manually slid towards each other.

4. The tray assembly according to claim 3, wherein slide track means are provided for directional stability when the slidable members of each pair are being moved towards or away from each other.

5. The tray assembly according to claim 4, wherein the slide track means is a ridge or flange formed on the slidable member which is releasably received in a groove or channel provided on the base tray.

6. The tray assembly according to claim 1, wherein the base and cooling trays are rectangular and the elevation means includes two manually slidable members disposed within the base tray such that one of the slidable members is positioned adjacent a first side of the base and the other slidable member is positioned adjacent an other side of the base, each slidable member having a profile which coacts with a corresponding profile formed on the cooling tray such that the cooling tray is lifted a predetermined distance when the slidable members are slidably rotated between the first position and the second position.

7. The tray assembly according to claim 3, wherein the slidable members are provided with a protruding handle for manual actuation of the sliding members.

8. The tray assembly according to claim 7, wherein the side of the base tray is provided with slots for receiving the handles of the slidable members wherein the handles are moved along the slots as the slidable members are moved from the first position to the second position.

9. The tray assembly according to claim 1, wherein the base tray has a raised peripheral edge to prevent the at least one article from sliding off the surface when the cooling tray is seated on the base.

10. The tray assembly according to claim 9, wherein the elevation means is adapted to lift the cooling tray to a distance above the raised peripheral edge of the base tray.

11. The tray assembly according to claim 3, wherein retaining means are provided to retain the slidable members in the second position.

12. The tray assembly according to claim 1, including a cover for fitting over each of the at least one article to be baked.

13. The tray assembly according to claim 1, wherein stacking means are provided to allow a plurality of tray assemblies to be vertically stacked such that articles on each of the stacked assemblies may be baked simultaneously.

14. The tray assembly according to claim 11, wherein the stacking means includes a plurality of stacking struts and the base tray includes recesses for positioning and stabilizing the struts.

15. The tray assembly according to claim 1, wherein the elevation means is a pair of elongate members bent into a generally u-shaped configuration no wider than the base tray so that the u-shaped members can lie flat on the base tray with their respective legs extending towards each other;

the free end of both legs, of each u-shaped member, have a raised arcuate portion extending upwardly when the u-shaped members lie flat on the base tray;

the cooling tray having a pair of raised flanges on two opposing sides, the raised flanges in each pair being spaced apart so that when the u-shaped members are in the first position where they are retracted and relatively close to each other, the cooling tray is seated on the base; and, when the u-shaped members are pulled away from each other into the second position, the raised flanges ride up on the arcuate portions to lift the cooling tray a predetermined distance from the base to allow air circulation through the apertures to cool the at least one article.

16. The tray assembly according to claim 15, wherein the ends of the u-shaped members have stop means to abut the raised flanges when the u-shaped members are in the second position.

* * * * *